(12) United States Patent
Mu

(10) Patent No.: US 12,089,222 B2
(45) Date of Patent: Sep. 10, 2024

(54) DATA TRANSMISSION METHOD AND DEVICE, AND READABLE STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 582 days.

(21) Appl. No.: 17/287,222

(22) PCT Filed: Oct. 30, 2018

(86) PCT No.: PCT/CN2018/112754
§ 371 (c)(1),
(2) Date: Apr. 21, 2021

(87) PCT Pub. No.: WO2020/087287
PCT Pub. Date: May 7, 2020

(65) Prior Publication Data
US 2021/0392672 A1    Dec. 16, 2021

(51) Int. Cl.
*H04W 72/23*   (2023.01)
*H04B 1/713*   (2011.01)

(52) U.S. Cl.
CPC ............ *H04W 72/23* (2023.01); *H04B 1/713* (2013.01)

(58) Field of Classification Search
None
See application file for complete search history.

(56) References Cited

U.S. PATENT DOCUMENTS

| 11,595,997 B2* | 2/2023 | Moroga ............... H04L 1/189 |
| 2018/0146438 A1* | 5/2018 | Yi ........................ H04W 52/24 |

(Continued)

FOREIGN PATENT DOCUMENTS

| EP | 3280087 A1 | 2/2018 |
| JP | 2021523449 A | 9/2021 |

(Continued)

OTHER PUBLICATIONS

NEC: "Frequency hopping pattern for LTE Rel-13 MTC", 3GPP TSG RAN WG1 Meeting #83; R1-156682, Anaheim, USA, Nov. 15-22, 2015, 6 pages.

(Continued)

*Primary Examiner* — Anh Vu H Ly
(74) *Attorney, Agent, or Firm* — Cozen O'Connor

(57) ABSTRACT

Disclosed is a data transmission method, belonging to the technical field of wireless communications. The method comprises: receiving scheduling information sent by a base station in one PDCCH, wherein the scheduling information is used to schedule the transmission of at least two data blocks; acquiring a narrowband transmission set; acquiring a size parameter of an alternative transmission unit; and according to the narrowband transmission set and the size parameter of the alternative transmission unit, performing frequency hopping alternative transmission of at least two data blocks with the base station. The present disclosure simultaneously realizes the scheduling of repeated transmission and frequency hopping to transmission of multiple data blocks between a terminal and a base station by means of scheduling information in one PDCCH.

16 Claims, 4 Drawing Sheets

(56) References Cited

U.S. PATENT DOCUMENTS

| | | | | |
|---|---|---|---|---|
| 2018/0278371 | A1* | 9/2018 | Chien | H04L 1/0025 |
| 2019/0081743 | A1* | 3/2019 | Loehr | H04W 76/28 |
| 2019/0174510 | A1* | 6/2019 | Shin | H04W 72/00 |
| 2019/0223197 | A1* | 7/2019 | Shin | H04L 1/0031 |
| 2019/0261295 | A1* | 8/2019 | Peisa | H04W 48/12 |
| 2019/0288800 | A1* | 9/2019 | Hosseini | H04L 1/189 |
| 2020/0187237 | A1* | 6/2020 | Su | H04L 1/08 |
| 2021/0392648 | A1* | 12/2021 | Andersson | H04L 5/0044 |
| 2022/0061067 | A1* | 2/2022 | Andersson | H04W 72/23 |

FOREIGN PATENT DOCUMENTS

| | | | |
|---|---|---|---|
| WO | WO 2010133043 | A1 | 11/2010 |
| WO | WO 2016159680 | A1 | 10/2016 |
| WO | WO 2018062371 | A1 | 4/2018 |
| WO | WO 2018083660 | A1 | 5/2018 |
| WO | WO 2018143033 | A1 | 8/2018 |

OTHER PUBLICATIONS

PCT/CN2018/112754 English translation fo the International Search Report dated Jul. 2, 2019, 2 pages.
Indian Patent Application No. 202147019524, Office Action dated Feb. 17, 2022, 6 pages.
European Patent Application No. 18938794.7, Search and Opinion dated Jun. 14, 2022, 9 pages.
Japanese Patent Application No. 2021-523449, Office Action dated Jun. 28, 2022, 4 pages.
Japanese Patent Application No. 2021-523449, English translation of Office Action dated Jun. 28, 2022, 4 pages.
Ericsson "Scheduling of multiple DUL transport blocks in LTE-MTC" 3GPP TSG RAN WG1 Meeting #94bis; R1-1810187; Oct. 2018; 6 pages.
Xiaomi Communications "Discussion on the scheduling of multiple DL/UL TBs" 3GPP TSG RAN WG1 Meeting #94bis; R1-1810813; Oct. 2018; 4 pages.
NEC "Frequency hopping schemes for NR UL PUSCH"; 3GPP TSG RAN WG1 Meeting #91; R1-1720900; Nov. 2017; 5 pages.
Ericsson "PDSCH demodulation requirements for UE DL Cat-M2" 3GPP TSG RAN WG4 Meeting #84; R4-1707671; 4 pages.
Japanese Patent Application No. 2023-026436, Office Action dated Sep. 5, 2023, 5 pages.
Japanese Patent Application No. 2023-026436, English translation of Office Action dated Sep. 5, 2023, 3 pages.
Korean Patent Application No. 10-2021-7015997, Office Action dated Apr. 19, 2024, 6 pages.
Korean Patent Application No. 10-2021-7015997, English translation of Office Action dated Apr. 19, 2024, 7 pages.

* cited by examiner

DATA TRANSMISSION METHOD AND DEVICE, AND READABLE STORAGE MEDIUM

CROSS-REFERENCE TO RELATED APPLICATION

This application is a U.S. national phase of International Application No. PCT/CN2018/112754, filed with the State Intellectual Property Office of P. R. China on Oct. 30, 2018, the content of which is incorporated herein by reference in its entirety.

TECHNICAL FIELD

The present disclosure relates to a field of communication technology, and more particularly, to a method and an apparatus for transmitting data and a readable storage medium.

BACKGROUND

MTC (Machine Type Communication) technology is widely used with continuing development of the Internet of Things.

In the related art, in order to save scheduling resources and power consumption of terminals, a base station in the MTC scenario can schedule a transmission of multiple transmission blocks in one scheduling. In order to improve time diversity effect and transmission efficiency, there is a need to use an alternating transmission mechanism in the scheduling of the multiple transmission blocks. Further, in order to ensure cross sub-frame channel estimation and symbol combining gains, there is also a need for multiple repeated transmissions of one transmission block.

However, in the related art, there is no solution of realizing scheduling of both the repeated transmissions and frequency hopping transmission of multiple transmission blocks at the same time.

SUMMARY

The present disclosure provides a method and an apparatus for transmitting data and a readable storage medium. The technical solution will be described as follows.

According to a first aspect of embodiments of the present disclosure, a method for transmitting data is provided. The method is performed by a terminal and includes: receiving schedule information sent by a base station in a physical downlink control channel (PDCCH), in which the schedule information is used to schedule a transmission of at least two transmission blocks; obtaining a transmission narrow-band set of the at least two transmission blocks, in which the transmission narrow-band set includes at least two narrow-bands; obtaining a size parameter of an alternating transmission unit, in which the alternating transmission unit is a data unit composed of multiple repeated transmissions of any one of the at least two transmission blocks, and the size parameter indicates a number of the repeated transmissions of the transmission block in the alternating transmission unit; performing an alternating frequency hopping transmission of the at least two transmission blocks with the base station based on the transmission narrow-band set and the size parameter.

According to a second aspect of embodiments of the present disclosure, a method for transmitting data is provided. The method is performed by a base station and includes: sending schedule information to a terminal in a physical downlink control channel (PDCCH), in which the schedule information is used to schedule a transmission of at least two transmission blocks; obtaining a transmission narrow-band set of the at least two transmission blocks, in which the transmission narrow-band set includes at least two narrow-bands; obtaining a size parameter of an alternating transmission unit, in which the alternating transmission unit is a data unit composed of multiple repeated transmissions of any one of the at least two transmission blocks, and the size parameter indicates a number of the repeated transmissions of the transmission block in the alternating transmission unit; performing an alternating frequency hopping transmission of the at least two transmission blocks with the terminal based on the transmission narrow-band set and the size parameter.

According to a third aspect of embodiments of the present disclosure, an apparatus for transmitting data is provided. The apparatus is performed by a terminal and includes a schedule information receiving module, a narrow-band set obtaining module, a size parameter obtaining module and a transmitting module. The schedule information receiving module is configured to receive schedule information sent by a base station in a physical downlink control channel (PDCCH), in which the schedule information is used to schedule a transmission of at least two transmission blocks. The narrow-band set obtaining module is configured to obtain a transmission narrow-band set of the at least two transmission blocks, in which the transmission narrow-band set includes at least two narrow-bands. The size parameter obtaining module is configured to obtain a size parameter of an alternating transmission unit, in which the alternating transmission unit is a data unit composed of multiple repeated transmissions of any one of the at least two transmission blocks, and the size parameter indicates a number of the repeated transmissions of the transmission block in the alternating transmission unit. The transmitting module is configured to perform an alternating frequency hopping transmission of the at least two transmission blocks with the base station based on the transmission narrow-band set and the size parameter.

According to a fourth aspect of embodiments of the present disclosure, an apparatus for transmitting data is provided. The apparatus is performed by a base station and includes a schedule information sending module, a narrow-band set obtaining module, a size parameter obtaining module and a transmitting module. The schedule information sending module is configured to send schedule information to a terminal in a physical downlink control channel (PDCCH), in which the schedule information is used to schedule a transmission of at least two transmission blocks. The narrow-band set obtaining module is configured to obtain a transmission narrow-band set of the at least two transmission blocks, in which the transmission narrow-band set includes at least two narrow-bands. The size parameter obtaining module is configured to obtain a size parameter of an alternating transmission unit, in which the alternating transmission unit is a data unit composed of multiple repeated transmissions of any one of the at least two transmission blocks, and the size parameter indicates a number of the repeated transmissions of the transmission block in the alternating transmission unit. The transmitting module is configured to perform an alternating frequency hopping transmission of the at least two transmission blocks with the terminal based on the transmission narrow-band set and the size parameter.

According to a fifth aspect of embodiments of the present disclosure, a data transmission system is provided. The system includes a terminal and a base station. The terminal includes the apparatus for transmitting data according to the third aspect. The base station includes the apparatus for transmitting data according to the fourth aspect.

According to a sixth aspect of embodiments of the present disclosure, a device for transmitting data is provided. The device is applicable in a terminal and includes a processor and a memory configured to store instructions executable by the processor. The processor is configured to receive schedule information sent by a base station in a physical downlink control channel (PDCCH), in which the schedule information is used to schedule a transmission of at least two transmission blocks; obtain a transmission narrow-band set of the at least two transmission blocks, in which the transmission narrow-band set includes at least two narrow-bands; obtain a size parameter of an alternating transmission unit, in which the alternating transmission unit is a data unit composed of multiple repeated transmissions of any one of the at least two transmission blocks, and the size parameter indicates a number of the repeated transmissions of the transmission block in the alternating transmission unit; perform an alternating frequency hopping transmission of the at least two transmission blocks with the base station based on the transmission narrow-band set and the size parameter.

According to a seventh aspect of embodiments of the present disclosure, a device for transmitting data based on uplink grant-free scheduling is provided. The device is applicable in a base station and includes a processor and a memory configured to store instructions executable by the processor. The processor is configured to send schedule information to a terminal in a physical downlink control channel (PDCCH), in which the schedule information is used to schedule a transmission of at least two transmission blocks; obtain a transmission narrow-band set of the at least two transmission blocks, in which the transmission narrow-band set includes at least two narrow-bands; obtain a size parameter of an alternating transmission unit, in which the alternating transmission unit is a data unit composed of multiple repeated transmissions of any one of the at least two transmission blocks, and the size parameter indicates a number of the repeated transmissions of the transmission block in the alternating transmission unit; perform an alternating frequency hopping transmission of the at least two transmission blocks with the terminal based on the transmission narrow-band set and the size parameter.

According to an eighth aspect of embodiments of the present disclosure, a computer-readable storage medium is provided. The computer-readable storage medium includes executable instructions called by a processor in a terminal to implement the method for transmitting data according to the first aspect or any implementation of the first aspect.

According to a ninth aspect of embodiments of the present disclosure, a computer-readable storage medium is provided. The computer-readable storage medium includes executable instructions called by a processor in a base station to implement the method for transmitting data according to the second aspect or any implementation of the second aspect.

It should be understood that the above general description and the following details are explanatory and illustrative, and shall not be construed to limit the present disclosure.

BRIEF DESCRIPTION OF THE DRAWINGS

The accompanying drawings are incorporated into the disclosure as one part therein to illustrate embodiments of the present disclosure. The accompanying drawings together with the specification explain the principle of the present disclosure.

DETAILED DESCRIPTION

Figure 1:
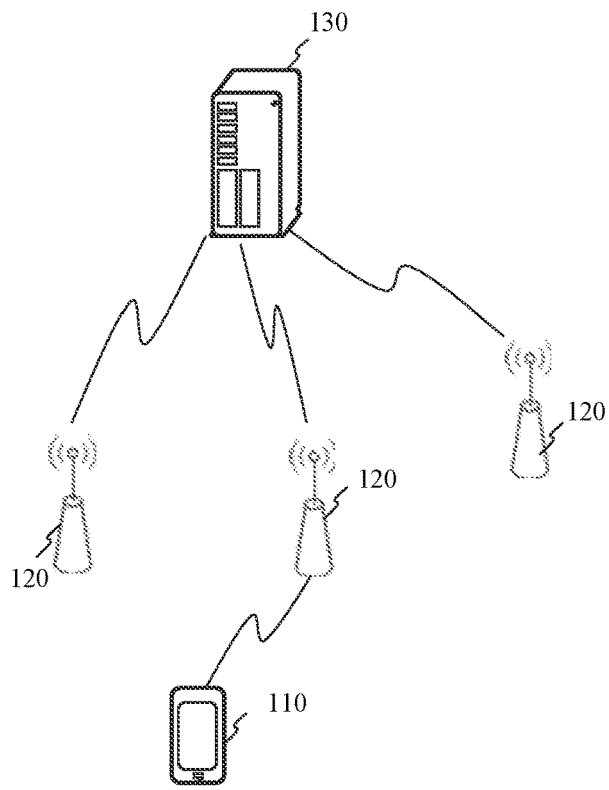
FIG. 1 is a schematic diagram illustrating a wireless communication system according to some example embodiments.

Reference will be made in detail to embodiments of the present disclosure. Throughout the description with reference to the accompanying drawings, unless specified or limited otherwise, the same or similar elements and the elements are denoted by the same reference numeral in different drawings. The implementations described in the following embodiments shall not be construed to represent all implementations of the present disclosure. Rather, they are merely some examples of the apparatus and method according to some aspects of the present disclosure, as described in the claims.

It should also be understood that, as used herein, "several" means one or more than one, and "a plurality of" means two or more than two, unless specified otherwise. The term "and/or" describes association relations of associated objects and represents three kinds of relations of the associated objects. For example, A and/or B may represent merely A, both A and B, merely B. The character "/" generally represents the relation "or" of the associated objects.

Recently, with vigorous development of the Internet of Things (IoT) technology, IoT devices bring a lot of convenience for people's life and work. MTC (Machine Type Communication) technology is representative of the cellar IoT technology. At present, such a technology has been widely used in a smart city field (such as meter reading), a smart agriculture field (such as collecting temperature and humility information), a smart transportation field (such as sharing bikes), and so on. Considering the wide application of MTC and the application scene having a low requirement on communication capability, such as the scene of collecting data, MTC terminal is characterized in low manufacturing cost. Correspondingly, in order to reduce the manufacturing cost and control the cost, the processing capability of the MTC terminal is greatly reduced compared to an ordinary user terminal such as phone.

Since the MTC terminal is mostly deployed at a region such as a basement where the propagation of wireless signals is limited and the terminal has limited hardware capability, the coverage capability in the MTC network is inferior to the conventional long term evolution (LTE) network. Therefore, in the MTC network, repeated transmissions are typically used to accumulate power, and thus further to realize a coverage enhancement, i.e., realizing an effect of power accumulation by the repeated transmissions of same content in the time dimension. Simply, the repeated transmissions refer to transmitting the same content in several time units. The time unit may be a sub-frame or may be multiple sub-frames.

Further, since the MTC terminal is mostly deployed at a place such as in the wild, or in a basement where charging is difficult to perform or a battery is difficult to replace, power saving is a significant characteristic for the MTC terminal.

As described above, in order to realize the coverage enhancement in the MTC network, multiple repeated transmissions of one transmission block are performed. At the same time, in order to obtain the better frequency diversity gain, the frequency hopping transmission of multiple repeatedly-transmitted transmission blocks is performed. Further, in order to ensure cross a sub-frame channel estimation gain and a symbol combining gain in the frequency hopping transmission, the base station may configure to perform multiple (such as Ych times) repeated transmissions continuously at a certain frequency position.

For example, after the terminal performs Ych times of repeated transmissions of one transmission block at a certain frequency position, the terminal may transmit the transmission block for Ych times continuously at another frequency position by means of frequency hops. The parameter Ych is defined as a frequency hopping interval. In detail, for example, in a frequency division duplexing (FDD) coverage enhancement mode A, a value range of Ych is $\{1, 2, 4, 8\}$. In an FDD coverage enhancement mode B, a value range of Ych is $\{2, 4, 8, 16\}$. In a time division duplexing (TDD) coverage enhancement mode A, a value range of Ych is $\{1, 5, 10, 20\}$. In a TDD coverage enhancement mode B, a value range of Ych is $\{5, 10, 20, 40\}$.

Similar to scheduling of the conventional LTE, an MTC physical downlink control channel (MPDCCH) in the MTC schedules an MTC physical downlink shared channel (MPDSCH) or an MTC physical uplink shared channel (MPUSCH). The MTC terminal needs to receive and blind test the MPDCCH before sending or receiving data. When the MTC terminal sends or receives a big data packet, some rounds of scheduling may be required to complete the sending or receiving. In most case, since the channel states are similar, the scheduling content of server MPDCCHs may be similar. In one implementation, even in this case, the terminal still needs to demodulate each scheduled MPDCCH, thus resulting in a high power consumption.

In order to avoid the power consumption described above, the present disclosure further presents a solution of continuously scheduling multiple uplink or downlink transmission blocks (TBs) through one MPDCCH.

Considering that there may be repeated transmissions in the MTC, there is a need of performing several transmissions of each of multiple transmission blocks through one MPDCCH scheduling.

Further, in order to improve an effect of time diversity and transmission efficiency, there is also a need of using an alternating transmission mechanism in the scheduling of multiple TBs, i.e., alternating repeated-transmissions of different TBs. Further, in order to ensure the cross sub-frame channel estimation and symbol combining gains, one alternating transmission unit may contain multiple repeated transmissions. In the present disclosure, the number of repeated transmissions contained in the alternating transmission unit is defined as a size of the alternating transmission unit.

At present, the alternating transmission of TB does not have a uniform standard, and the number of repeated transmissions contained in one alternating transmission unit is not definite. In other words, the terminal may configure both the frequency hopping transmission and the alternating transmission of TB. But there are no corresponding solutions about how to configure and set the number of repeated transmissions of TB contained in one alternating transmission unit to coordinate the frequency hopping transmission and the alternating transmission of TB and how to realize frequency hops in the case of the alternating transmission of multiple TBs.

The present disclosure provides a solution of designing a configuration method and a configuration scope of an alternating transmission unit in the alternating transmission of TB to better match the frequency hopping transmission and further provides a solution of designing the frequency hopping transmission in the case of the alternating transmission of multiple TBs.

Embodiments of the present disclosure provide a solution of transmitting data, which may be applied in a wireless communication system to realize repeated transmissions and a frequency hopping transmission of multiple transmission blocks between a terminal and a base station.

FIG. 1 is a schematic diagram of a wireless communication system according some embodiments. As illustrated in FIG. 1, the mobile communication system may include several terminals 110 and several base stations 120.

The terminal 110 may be a device providing speech and/or data connectivity to a user. The terminal 110 may communicate with one or more core networks via a radio access network (RAN). The terminal 110 may be an IoT terminal, such as a sensor, a mobile phone (or referred as "cellular" phone), and a computer having the IoT terminal, for example, a stationary, portable, pocket, handheld, computer built-in or vehicle-mounted device, such as station (STA), subscriber unit, subscriber station, mobile station, mobile, remote station, access point, remote terminal, access terminal, user terminal, user agent, user device, or user equipment (UE). Or, the terminal 110 may also an unmanned aerial vehicle.

The base station 120 may be a network device in the wireless communication system. The wireless communication system may be the $4^{th}$ generation mobile communication (4G) system, also called long term evolution (LTE) system. Or, the wireless communication system may also the 5G system, also called new radio (NR) system. Or, the wireless communication system may be the next generation system of the 5G system.

The base station 120 may be an evolved base station (eNB) adopted in the 4G system. Or, the base station 120 may a next generation node base station (gNB) which adopts a centralized-distributed architecture in the 5G system. When the base station 120 adopts the centralized-distributed architecture, the base station typically includes a central unit (CU) and at least two distributed units (DUs). The central unit is provided with a protocol stack including a packet data convergence protocol (PDCD) layer, a radio link control (RLC) layer, a media access control (MAC) layer. The distributed unit is provided with a protocol stack including a physical (PHY) layer. A detailed implementation of the base station 120 is not limited in the embodiments of the present disclosure.

A wireless connection can be established between the base station 120 and the terminal 110 via a wireless radio. In different implementations, the wireless radio is a wireless radio based on a 4G standard. Alternatively, the wireless radio is a wireless radio based on a 5G standard, for example, the wireless radio is the new radio. Or the wireless radio may also be a wireless radio based on a next generation mobile communication network technology standard of the 5G.

Alternatively, the above wireless communication system may further include a network management device 130.

The several base stations 120 are connected to the network management device 130, respectively. The network management device 130 may be a core network device in the wireless communication system, for example, the network management device 130 may be a mobility management entity (MME) in an evolved packet core (EPC) network. Or the network management device may also be a device in other core network, for example serving gateway (SGW), public data network gateway (PGW), policy and charging rules function (PCRF) or home subscriber server (HSS) and so on. A detailed implementation of the network management device 130 is not limited in the embodiments of the present disclosure.

When data transmission is performed between the terminal and the base station, the base station may schedule the repeated transmissions and the frequency hopping transmission of multiple transmission blocks through one PDCCH at the same time.

Figure 2:
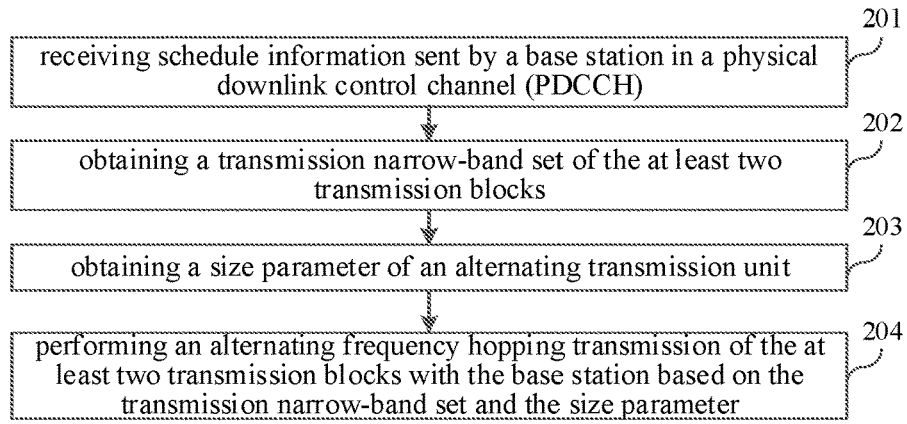
FIG. 2 is a flowchart illustrating a method for transmitting data according to an example embodiment.

FIG. 2 is a flowchart illustrating a method for transmitting data according to an example embodiment. As illustrated in FIG. 2, the method is applied in the wireless communication system shown in FIG. 1 and performed by the terminal 110 in FIG. 1. The method may include the following.

At block 201, schedule information sent by the base station in a physical downlink control channel (PDCCH) is received. The schedule information is used to schedule transmission of at least two transmission blocks.

At block 202, a transmission narrow-band set of the at least two transmission blocks is obtained. The transmission narrow-band set contains at least two narrow-bands.

At block 203, a size parameter of an alternating transmission unit is obtained. The alternating transmission unit is a data unit composed of multiple repeated transmissions of any one transmission block in the at least two transmission blocks. The size parameter indicates the number of repeated transmissions of the transmission block in the alternating transmission unit.

At block 204, an alternating frequency hopping transmission of the at least two transmission blocks is performed with the base station based on the transmission narrow-band set and the size parameter.

Alternatively, the at least two transmission blocks correspond to respective transmission narrow-band sets, each transmission narrow-band set includes at least two narrow-bands. The alternating frequency hopping transmission of the at least two transmission blocks may be performed with the base station based on the transmission narrow-band set and the size parameter as follows.

Step a, an alternating transmission unit of a first target transmission block is transmitted with the base station on a narrow-band of the transmission narrow-band set corresponding to the first target transmission block. The first target transmission block is any one of the at least two transmission blocks.

Step b, after the transmission of the alternating transmission unit of the first target transmission block is completed, an alternating transmission unit of a second target transmission block is transmitted with the base station on a narrow-band of the transmission narrow-band set corresponding to the second target transmission block. The second target transmission block is any one of remaining transmission blocks of the at least two transmission blocks.

Step c, after one round of transmission of an alternating transmission unit of each of the at least two transmission blocks is completed, it is determined whether transmissions of all the alternating transmission units of each of the at least two transmission blocks are completed, if yes, the transmitting is stopped, or else steps a-b are performed.

Alternatively, the at least two transmission blocks correspond to a common transmission narrow-band set. The alternating frequency hopping transmission of the at least two transmission blocks may be performed with the base station based on the transmission narrow-band set and the size parameter as follows.

Step a, an alternating transmission unit of a first transmission block is transmitted with the base station on a first narrow-band of the transmission narrow-band set. The first transmission block is any one of the at least two transmission blocks and the first narrow-band is any one narrow-band of the transmission narrow-band set.

Step b, after the transmission of the alternating transmission unit of the first transmission block is completed, an alternating transmission unit of a second transmission block is transmitted with the base station on a second narrow-band different from the first narrow-band of the transmission narrow-band set. The second transmission block is any one of remaining transmission blocks of the at least two transmission blocks.

Step c, after one round of transmission of an alternating transmission unit of each of the at least two transmission blocks is completed, it is determined whether transmissions of all the alternating transmission units of each of the at least two transmission blocks are completed, if yes, the transmitting is stopped, or else steps a-b are performed.

Alternatively, the transmission narrow-band set of the at least two transmission blocks is obtained as follows. A starting transmission narrow-band of the at least two transmission blocks contained in the schedule information is obtained. A frequency hopping step size pre-configured by the base station for the terminal is obtained. The frequency hopping step size is used to indicate a narrow-band interval between two adjacent narrow-bands in the frequency hopping transmission. At least two narrow-bands for the frequency hopping transmission of the at least two transmission blocks are obtained based on the starting transmission narrow-band and the frequency hopping step size. The transmission narrow-band set is obtained based on the at least two narrow-bands for the frequency hopping transmission of the at least two transmission blocks.

Alternatively, the transmission narrow-band set of the at least two transmission blocks is obtained based on the schedule information as follows. The transmission narrow-band set of the at least two transmission blocks contained in the schedule information is obtained.

Alternatively, the size parameter of the alternating transmission unit is obtained as follows. A parameter value of a frequency hopping interval pre-configured by the base station is obtained. The parameter value is configured to indicate the number of repeated transmissions of one transmission block in each frequency hopping transmission. The parameter value is obtained as a value of the size parameter.

Alternatively, the size parameter of the alternating transmission unit is obtained as follows. The size parameter pre-configured by the base station via a broadcast signaling or a user specific signaling is obtained. Or the size parameter sent by the base station via the PDCCH is obtained.

Alternatively, the size parameter of the alternating transmission unit is obtained as follows. The step of obtaining the size parameter pre-configured by the base station via a broadcast signaling or a user specific signaling is performed or the step of obtaining the size parameter sent by the base station via the PDCCH is performed when the base station pre-configures a parameter value of a frequency hopping interval for the terminal and the terminal does not activate the frequency hopping transmission.

Alternatively, the size parameter of the alternating transmission unit is obtained as follows. A parameter value of a frequency hopping interval is obtained as a value of the size parameter when the base station pre-configures the parameter value of the frequency hopping interval for the terminal and the terminal activates the frequency hopping transmission.

Alternatively, in a frequency division duplexing (FDD) coverage enhancement mode A, a value range of the size parameter is {1, 2, 4, 8}.

In a frequency division duplexing (FDD) coverage enhancement mode B, a value range of the size parameter is {2, 4, 8, 16}.

In a time division duplexing (TDD) coverage enhancement mode A, a value range of the size parameter is {1, 5, 10, 20}.

In a time division duplexing (TDD) coverage enhancement mode B, a value range of the size parameter is {5, 10, 20, 40}.

In conclusion, with the solution according to the embodiments of the present disclosure, after the terminal receives the schedule information indicating at least two transmission blocks sent by the base station in the physical downlink control channel (PDCCH), the terminal may obtain the transmission narrow-band set of the at least two transmission blocks, obtain the size parameter of the alternating transmission unit, and perform the alternating frequency hopping transmission of the at least two transmission blocks with the base station based on the transmission narrow-band set and the size parameter, such that the scheduling of both the repeated transmissions and frequency hopping transmission of multiple transmission blocks between the terminal and the base station can be realized at the same time through the schedule information in the PDCCH.

Figure 3:
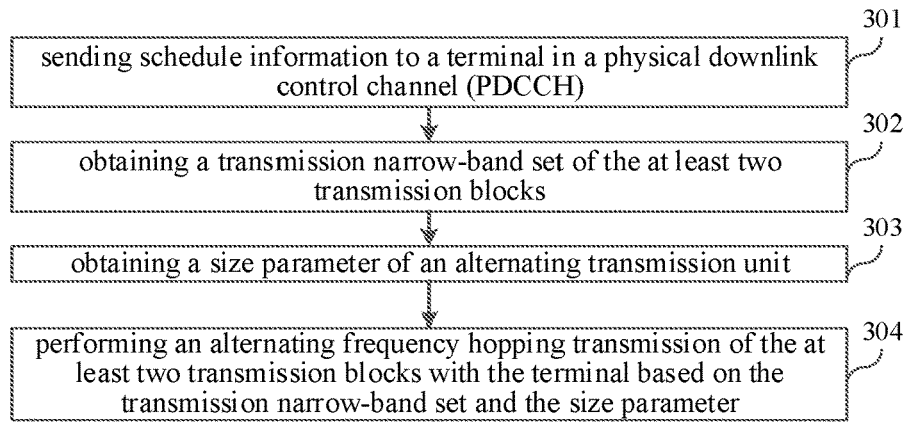
FIG. 3 is a flowchart illustrating a method for transmitting data according to an example embodiment.

FIG. 3 is a flowchart illustrating a method for transmitting data according to an example embodiment. As illustrated in FIG. 3, the method is applied in the wireless communication system shown in FIG. 1 and performed by the base station 120 in FIG. 1. The method may include the following.

At block 301, schedule information is sent to the terminal in a physical downlink control channel (PDCCH). The schedule information is used to schedule transmission of at least two transmission blocks.

At block 302, a transmission narrow-band set of the at least two transmission blocks is obtained. The transmission narrow-band set contains at least two narrow-bands.

At block 303, a size parameter of an alternating transmission unit is obtained. The alternating transmission unit is a data unit composed of multiple repeated transmissions of any one transmission block in the at least two transmission blocks. The size parameter indicates the number of repeated transmissions of the transmission block in the alternating transmission unit.

At block 304, an alternating frequency hopping transmission of the at least two transmission blocks is performed with the terminal based on the transmission narrow-band set and the size parameter.

Alternatively, the at least two transmission blocks correspond to respective transmission narrow-band sets, each transmission narrow-band set includes at least two narrow-bands. The alternating frequency hopping transmission of the at least two transmission blocks may be performed with the terminal based on the transmission narrow-band set and the size parameter as follows.

Step a, an alternating transmission unit of a first target transmission block is transmitted with the terminal on a narrow-band of the transmission narrow-band set corresponding to the first target transmission block. The first target transmission block is any one of the at least two transmission blocks.

Step b, after the transmission of the alternating transmission unit of the first target transmission block is completed, an alternating transmission unit of a second target transmission block is transmitted with the terminal on a narrow-band of the transmission narrow-band set corresponding to the second target transmission block. The second target transmission block is any one of remaining transmission blocks of the at least two transmission blocks.

Step c, after one round of transmission of an alternating transmission unit of each of the at least two transmission blocks is completed, it is determined whether transmissions of all the alternating transmission units of each of the at least two transmission blocks are completed, if yes, the transmitting is stopped, or else steps a-b are performed.

Alternatively, the at least two transmission blocks correspond to a common transmission narrow-band set. The alternating frequency hopping transmission of the at least two transmission blocks may be performed with the terminal based on the transmission narrow-band set and the size parameter as follows.

Step a, an alternating transmission unit of a first transmission block is transmitted with the terminal on a first narrow-band of the transmission narrow-band set. The first transmission block is any one of the at least two transmission blocks and the first narrow-band is any one narrow-band of the transmission narrow-band set.

Step b, after the transmission of the alternating transmission unit of the first transmission block is completed, an alternating transmission unit of a second transmission block is transmitted with the terminal on a second narrow-band different from the first narrow-band of the transmission narrow-band set. The second transmission block is any one of remaining transmission blocks of the at least two transmission blocks.

Step c, after one round of transmission of an alternating transmission unit of each of the at least two transmission blocks is completed, it is determined whether transmissions of all the alternating transmission units of each of the at least two transmission blocks are completed, if yes, the transmitting is stopped, or else steps a-b are performed.

Alternatively, the transmission narrow-band set of the at least two transmission blocks is obtained as follows. A starting transmission narrow-band of the at least two transmission blocks is obtained. A frequency hopping step size configured for the terminal is obtained. The frequency hopping step size is used to indicate a narrow-band interval between two adjacent narrow-bands in the frequency hopping transmission. At least two narrow-bands for the frequency hopping transmission of the at least two transmission blocks are obtained based on the starting transmission narrow-band and the frequency hopping step size. The transmission narrow-band set is obtained based on the at least two narrow-bands for the frequency hopping transmission of the at least two transmission blocks.

Alternatively, before the schedule information is sent to the terminal in the PDCCH, the method further includes adding the transmission narrow-band set into the schedule information.

Alternatively, the size parameter of the alternating transmission unit is obtained as follows. A parameter value of a frequency hopping interval configured for the terminal is obtained when the frequency hopping interval is pre-configured for the terminal. The parameter value is configured to indicate the number of repeated transmissions of one transmission block in each frequency hopping transmission. The parameter value is obtained as a value of the size parameter.

Alternatively, the size parameter of the alternating transmission unit is obtained as follows. A first value is selected from a preset value set for the size parameter as a value of the size parameter when a frequency hopping interval is configured for the terminal and the terminal activates the frequency hopping transmission. The first value is the same as a parameter value of the frequency hopping interval. A second value is selected from a preset value set for the size parameter as a value of the size parameter when a frequency hopping interval is not configured for the terminal or when a frequency hopping interval is configured for the terminal and the terminal does not activate the frequency hopping transmission. The second value is any value in the preset value set.

Alternatively, the method further includes configuring the size parameter for the terminal via a broadcast signaling or a user specific signaling; or sending the size parameter to the terminal via the PDCCH.

Alternatively, in a frequency division duplexing (FDD) coverage enhancement mode A, a value range of the size parameter is {1, 2, 4, 8}.

In a frequency division duplexing (FDD) coverage enhancement mode B, a value range of the size parameter is {2, 4, 8, 16}.

In a time division duplexing (TDD) coverage enhancement mode A, a value range of the size parameter is {1, 5, 10, 20}.

In a time division duplexing (TDD) coverage enhancement mode B, a value range of the size parameter is {5, 10, 20, 40}.

In conclusion, with the solution according to the embodiments of the present disclosure, when the scheduling of data transmission is performed, the base station sends the schedule information used to schedule at least two transmission blocks to the terminal in the physical downlink control channel (PDCCH). During the data transmission, the base station may obtain the transmission narrow-band set of the at least two transmission blocks, obtain the size parameter of the alternating transmission unit, and perform the alternating frequency hopping transmission of the at least two transmission blocks with the terminal based on the transmission narrow-band set and the size parameter, such that the scheduling of both the repeated transmissions and frequency hopping transmission of multiple transmission blocks between the terminal and the base station can be realized at the same time through the schedule information in the PDCCH.

Figure 4:
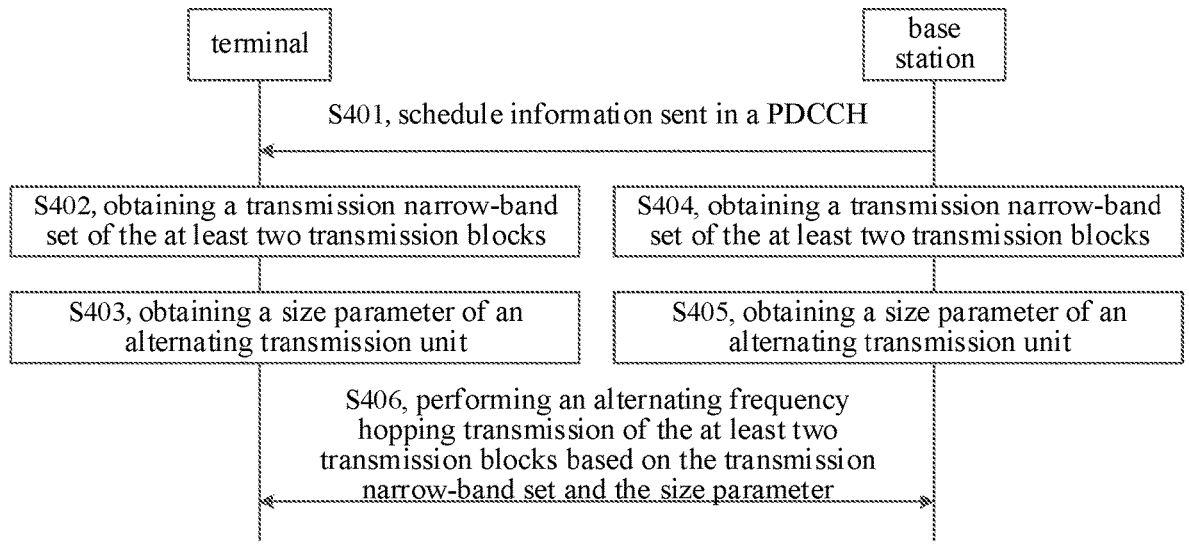
FIG. 4 is a flowchart illustrating a method for transmitting data according to an example embodiment.

FIG. 4 is a flowchart illustrating a method for transmitting data according to an example embodiment. As illustrated in FIG. 4, the method is applied in the wireless communication system shown in FIG. 1 and may include the following.

At block 401, the base station sends schedule information to the terminal in a physical downlink control channel (PDCCH), and the terminal receives the schedule information. The schedule information is used to schedule transmission of at least two transmission blocks.

For example, the terminal is the terminal in the MTC network, the above mentioned PDCCH may be MPDCCH.

In the embodiment of the present disclosure, the base station may be schedule transmission of multiple transmission blocks in one PDCCH. In detail, the base station may indicate frequency resources used during the transmission of the multiple transmission blocks in the schedule information sent to the terminal in one PDCCH, for example may indicate the narrow-band for transmitting the multiple transmission blocks.

Alternatively, in order to support the frequency hopping transmission of subsequent transmission blocks, the above schedule information may contain a starting transmission narrow-band of the at least two transmission blocks. Or, the above schedule information may also contain respective narrow-bands in the frequency hopping transmission of the at least two transmission blocks.

The above at least two transmission blocks may have the same starting transmission narrow-band or different transmission narrow-bands. Accordingly, the respective narrow-bands in the frequency hopping transmission of the at least two transmission blocks may be same or different.

Alternately, the above schedule information may not directly indicate time domain positions of the at least two transmission blocks. The time domain positions of the at least two transmission blocks may be indicated indirectly via a time domain position of the above PDCCH, for example, there may be fixed time domain offsets between the time domain positions of the at least two transmission blocks and the above PDCCH.

Or, the above schedule information may also directly indicate the time domain positions of the at least two transmission blocks. For example, the above schedule information may contain a time domain starting position of the at least two transmission blocks.

At block 402, the terminal obtains a transmission narrow-band set of the at least two transmission blocks based on the schedule information. The narrow-band set contains at least two narrow-bands.

In a possible implementation, when the transmission narrow-band set of the at least two transmission blocks is obtained based on the schedule information, the terminal may obtain a starting transmission narrow-band of the at least two transmission blocks contained in the schedule information, and obtain a frequency hopping step size pre-configured by the base station for the terminal. The frequency hopping step size is used to indicate a narrow-band interval between two adjacent narrow-bands in the frequency hopping transmission. Then the terminal obtains at least two narrow-bands for the frequency hopping transmission of the at least two transmission blocks based on the starting transmission narrow-band and the frequency hopping step size, and obtains the transmission narrow-band set based on the at least two narrow-bands.

In the embodiment of the present disclosure, a starting frequency position f1 for the frequency hopping transmission (i.e., the starting narrow-band for the frequency hopping transmission of transmission blocks) may be indicated by the PDCCH. f1 may be same or different for different TBs. Other narrow-bands for the frequency hopping transmission may be obtained by the following formula:

$$f(N+1)=(f1+N*\text{offset})\bmod M;$$

where f(N+1) represents the narrow-band for the (N+1)$^{th}$ frequency hopping transmission, offset represents the frequency hopping step size, M represents the total number of resource blocks (RBs) contained in the system bandwidth.

The frequency hopping step size may be pre-configured by the base station via a broadcast signaling or a user specific signaling. Or the frequency hopping step size may also be sent by the base station to the terminal via the PDCCH, for example, through the above schedule information, i.e., the schedule information contains the frequency hopping step size.

After the terminal obtains the respective narrow-bands for the frequency hopping transmission of transmission blocks, the terminal sorts the respective narrow-bands based on a calculating order to obtain the transmission narrow-band set of transmission blocks.

In another possible implementation, the above transmission narrow-band set may also be indicated by the base station to the terminal through the schedule information directly. When the terminal obtains the transmission narrow-band set of the at least two transmission blocks based on the schedule information, the schedule information contains the transmission narrow-band set of the at least two transmission blocks.

At block 403, the terminal obtains a size parameter of an alternating transmission unit. The alternating transmission unit is a data unit composed of multiple repeated transmissions of any transmission block in the at least two transmission blocks. The size parameter indicates the number of the repeated transmissions of the transmission block in the alternating transmission unit.

In the embodiment of the present disclosure, when data is transmitted between the terminal and the base station, data corresponding to one transmission block may be transmitted in units of the alternating transmission unit, i.e., configuring that the number of continuous repeated transmissions of one transmission block is n, and n repeated transmissions of one transmission block forms one alternating transmission unit. The size of the alternating transmission unit is the number of repeated transmissions of the transmission block in the alternating transmission unit.

Alternatively, when obtaining the size parameter of the alternating transmission unit, the terminal may obtain a parameter value of a frequency hopping interval pre-configured by the base station and take the parameter value as the a value of the size parameter of the alternating transmission unit. The parameter value of the frequency hopping interval is used to indicate the number of repeated transmissions of one transmission block in each frequency hopping transmission.

In the embodiment of the present disclosure, when the terminal is configured with the corresponding frequency hopping interval, the terminal may directly reuse the parameter value corresponding to the frequency hopping interval as the value of the size parameter of the alternating transmission unit. For example, if the frequency hopping interval of the terminal is 2, the size parameter of the alternating transmission unit obtained by the terminal is also 2.

The above frequency hopping interval may be pre-configured by the base station via the broadcast signaling or the user specific signaling.

Alternatively, the size parameter of the alternating transmission unit may also be configured by the base station. For example, the base station pre-configures the size parameter of the alternating transmission unit via the broadcast signaling or the user specific signaling. Or, the base station may notify the terminal of the size parameter of the alternating transmission unit via the PDCCH. Correspondingly, the terminal obtains the size parameter of the alternating transmission unit pre-configured by the base station via the broadcast signaling or the user specific signaling, or obtains the size parameter of the alternating transmission unit sent by the base station via the PDCCH.

Alternatively, when the base station pre-configures the parameter value of the frequency hopping interval for the terminal and the terminal does not activate the frequency hopping transmission, the terminal obtains the size parameter of the alternating transmission unit pre-configured by the base station via the broadcast signaling or the user specific signaling. Or when the base station pre-configures the parameter value of the frequency hopping interval for the terminal and the terminal does not activate the frequency hopping transmission, the terminal obtains the size parameter of the alternating transmission unit sent by the base station via the PDCCH.

Alternatively, when the base station pre-configures the parameter value of the frequency hopping interval for the terminal and the terminal activates the frequency hopping transmission, the terminal obtains the parameter value of the frequency hopping interval as the value of the size parameter of the alternating transmission unit.

At block 404, the base station obtains the transmission narrow-band set of the at least two transmission blocks.

In the embodiment of the present disclosure, when the base station obtains the transmission narrow-band set of the at least two transmission blocks, the base station may obtain a starting transmission narrow-band of the at least two transmission blocks, obtain the frequency hopping step size configured by the terminal, obtain the at least two narrow-bands for the frequency hopping transmission based on the starting transmission narrow-band and the frequency hopping step size and obtain the transmission narrow-band set based on the at least two narrow-bands for the frequency hopping transmission.

After generating the schedule information of the terminal, the base station may obtain at least two narrow-bands to obtain the transmission narrow-band set in combination of the starting transmission narrow-band of the at least two transmission blocks contained in the schedule information.

Alternatively, before sending the schedule information to the terminal in the PDCCH, the base station may add the transmission narrow-band set into the schedule information, such that the terminal may directly obtain at least two narrow-bands to obtain the transmission narrow-band set.

Or, the base station may not directly indicate the at least two narrow-bands to obtain the transmission narrow-band set, the terminal may calculate the transmission narrow-band set based on the starting transmission narrow-band of the at least two transmission blocks in the schedule information autonomously.

At block 405, the base station obtains the size parameter of the alternating transmission unit.

Alternatively, when obtaining the size parameter of the alternating transmission unit, if the terminal is pre-configured with the frequency hopping interval, the base station obtains the parameter value of the frequency hopping interval configured for the terminal, and takes the parameter value as the value of the size parameter. The parameter value is used to indicate the number of repeated transmissions of one transmission block in each frequency hopping transmission.

In a possible implementation, when the terminal is configured with the corresponding frequency hopping interval, the base station may directly reuse the parameter value corresponding to the frequency hopping interval as the value of the size parameter.

Alternatively, when obtaining the size parameter of the alternating transmission unit, if the terminal is configured with the frequency hopping interval and the terminal activates the frequency hopping transmission, the base station selects a first value from a preset value set for the size parameter as the value of the size parameter. The first value is the same as the parameter value of the frequency hopping interval. If the terminal is not configured with the frequency hopping interval or if the terminal is configured with the frequency hopping interval and the terminal does not activate the frequency hopping transmission, the base station selects a second value from a preset value set for the size parameter as the value of the size parameter. The second value is any value in the preset value set.

In a possible implementation, the base station may set the size parameter of the alternating transmission unit based on whether the terminal is configured with the frequency hopping interval and whether the terminal activates the frequency hopping transmission.

For example, the base station may select a value different from the frequency hopping interval from a preset value range for configuration. In detail, for example, when the terminal is configured with the frequency hopping interval and the terminal activates the frequency hopping transmission, the base station sets the size parameter of the alternating transmission unit to coincide with the frequency hopping interval. When the frequency hopping transmission is not activated, the base station selects a value from the preset value range as the value of the size parameter of the alternating transmission unit.

For example, when the terminal is configured with the frequency hopping interval of 2, and the preset value range is {1, 2, 4, 8}, if the frequency hopping transmission is activated by the terminal, the base station specifies the value 2 as the value of the size parameter of the alternating transmission unit. If the frequency hopping transmission is not activated by the terminal, the base station may specify any value in the preset value range {1, 2, 4, 8} as the value of the size parameter of the alternating transmission unit.

Further, when the terminal is not configured with the frequency hopping interval, the base station may also select a value from the above value range as the value of the size parameter.

When the value of the size parameter of the alternating transmission unit is specified by the base station, the base station needs to configure the value of the size parameter for the terminal. The configuration method may include configuring within an entire cell via the broadcast signaling or specifically configuring for a terminal via the user specific signaling.

The above value range may be the same as a value range of the frequency hopping interval configured by the system for the terminal. For example, in the FDD coverage enhancement mode A, the above value range is {1, 2, 4, 8}. In the FDD coverage enhancement mode B, the above value range is {2, 4, 8, 16}. In the TDD coverage enhancement mode A, the above value range is {1, 5, 10, 20}. In the TDD coverage enhancement mode B, the above value range is {5, 10, 20, 40}.

Alternatively, in addition to configuring the size parameter of the alternating transmission unit for the terminal via the broadcast signaling or the user specific signaling, the base station may also send the size parameter to the terminal via the PDCCH. For example, the size parameter of the alternating transmission unit may be carried in the schedule information and sent by the base station to the terminal.

At block 406, the terminal and the base station perform the alternating frequency transmission of the at least two transmission blocks based on the transmission narrow-band set of the at least two transmission blocks and the size parameter of the alternating transmission unit.

Alternatively, the at least two transmission blocks correspond to respective transmission narrow-band sets. Each transmission narrow-band set contains at least two narrow-bands. When the alternating frequency transmission of the at least two transmission blocks is performed, the terminal and the base station may perform the transmission as follows.

Step a, the terminal and the base station transmit an alternating transmission unit of a first target transmission block on a narrow-band of the transmission narrow-band set corresponding to the first target transmission block. The first target transmission block is any one transmission block in the at least two transmission blocks.

Step b, after the transmission of the alternating transmission unit of the first target transmission block is completed, the terminal and the base station transmit an alternating transmission unit of a second target transmission block on a narrow-band of the transmission narrow-band set corresponding to the second target transmission block. The second target transmission block is any one transmission block in the remaining transmission blocks of the at least two transmission blocks.

Step c, after one round of transmission of an alternating transmission unit of each of the at least two transmission blocks is completed, the terminal and the base station each determines whether transmissions of all the alternating transmission units of each of the at least two transmission blocks are completed, if yes, the transmitting is stopped, or else steps a-b are performed.

Figure 5:
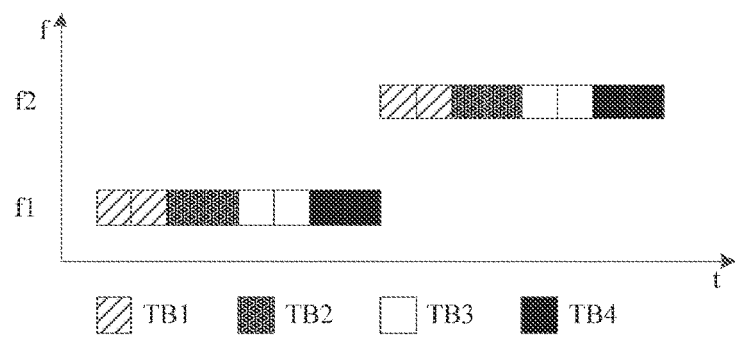
FIG. 5 is a schematic diagram illustrating an alternating frequency hopping transmission according to an example embodiment of FIG. 4.

In a possible implementation, the above transmission narrow-band set of the a1 least two transmission blocks contains transmission narrow-band sets corresponding respectively to the at least two transmission blocks. Each transmission narrow-band set contains at least two narrow-bands. When the terminal and the base station perform the data transmission, the frequency hopping transmission may be performed at a configured frequency position by taking a signal TB as the object. For example, with reference to FIG. 5, a schematic diagram illustrating an alternating frequency hopping transmission involved in the embodiment of the present disclosure is shown. As illustrated in FIG. 5, the base station configures two narrow-bands {f1, f2} of the frequency hopping transmission for four transmission blocks (which are TB1, TB2, TB3 and TB4, respectively) through the schedule information, and the size Z of the alternating transmission unit is 2. For each TB, it needs two repeated transmissions at the frequency position f1. For multiple TBs that are continuously transmitted on f1, the multiple TBs are transmitted alternately, and the size of the alternating transmission unit is 2. For example, the target transmission block is TB1, two continuous transmissions of TB1 are performed on f1 between the terminal and the base station, and two continuous transmissions of TB2 are performed on f1 between the terminal and the base station. After each transmission block is continuously transmitted twice on f1, the terminal and the base station perform two continuous transmissions of each of TB1-TB4 on f2 by means of frequency hopping.

It should be noted that, in the above description, the frequency hopping transmissions of respective TBs in FIG. 5 use the same narrow-band. However, in actual applications, the frequency hopping transmissions of respective TBs in FIG. 5 may use different narrow-bands.

Alternatively, the at least two transmission blocks correspond to a common transmission narrow-band set. When the alternating frequency transmission of the at least two transmission blocks is performed, the terminal and the base station may perform the transmission as follows.

Step a, the base station transmits with the terminal an alternating transmission unit of a first transmission block on a first narrow-band of the transmission narrow-band set. The first transmission block is any one transmission block of the at least two transmission blocks and the first narrow-band is any one narrow-band in the transmission narrow-band set.

Step b, after the transmission of the alternating transmission unit of the first transmission block is completed, the base station transmits with the terminal an alternating transmission unit of a second transmission block on a second narrow-band different from the first narrow-band in the transmission narrow-band set. The second transmission block is any one of remaining transmission blocks of the at least two transmission blocks.

Step c, after one round of transmission of an alternating transmission unit of each of the at least two transmission blocks is completed, it is determined whether transmissions of all the alternating transmission units of each of the at least two transmission blocks are completed, if yes, the transmitting is stopped, or else steps a-b are performed.

Figure 6:
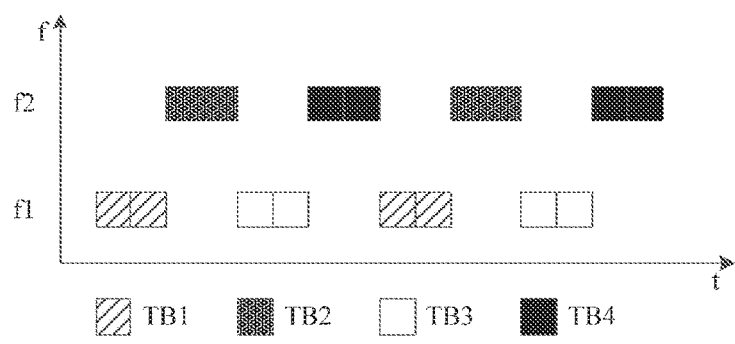
FIG. 6 is a schematic diagram illustrating an alternating frequency hopping transmission according to an example embodiment of FIG. 4.

In a possible implementation, the above transmission narrow-band set of the al least two transmission blocks may be a single transmission narrow-band set. When the terminal and the base station perform the data transmission, the frequency hopping transmission may be performed at configured frequency positions by taking multiple alternately-transmitted TBs as the object. For example, with reference to FIG. 6, a schematic diagram illustrating another alternating frequency hopping transmission involved in the embodiment of the present disclosure is shown. As illustrated in FIG. 6, the base station configures two narrow-bands {f1, f2} of the frequency hopping transmission for four transmission blocks (which are TB1, TB2, TB3 and TB4, respectively) through the schedule information, and the size Z of the alternating transmission unit is 2. For the alternating transmission of multiple TBs taken as the object, the frequency hopping is performed every two transmissions. For example, the first transmission block is TB1 and the second transmission block is TB2, as illustrated in FIG. 6, two continuous transmissions of TB1 are performed on f1 between the terminal and the base station, and two continuous transmissions of TB2 are performed on f2 between the terminal and the base station. And then two continuous transmissions of TB3 are performed on f1 between the terminal and the base station, and two continuous transmissions of TB4 are performed on f2 between the terminal and the base station, and so on.

In conclusion, with the solution according to the embodiment of the present disclosure, when the scheduling of data transmission is performed, the base station sends the schedule information used to schedule the transmission of at least two transmission blocks to the terminal in a physical downlink control channel (PDCCH). When the data transmission is performed, the base station and the terminal may respectively obtain the transmission narrow-band set of the at least two transmission sets, obtain the size parameter of the alternating transmission unit, and perform the alternating frequency hopping transmission of the at least two transmission blocks based on the transmission narrow-band set and the size parameter, such that the scheduling of both the repeated transmissions and frequency hopping transmission of multiple transmission blocks between the terminal and the base station can be realized at the same time through the schedule information in the PDCCH.

Further, the solution of the present disclosure provides the configure method of the size of the alternating transmission unit and two kinds of frequency hopping transmissions.

The apparatus embodiments of the present disclosure will be described below, which may be used to perform the method embodiments. With regard to details not disclosed in the apparatus embodiments, reference can be made to the method embodiments.

Figure 7:
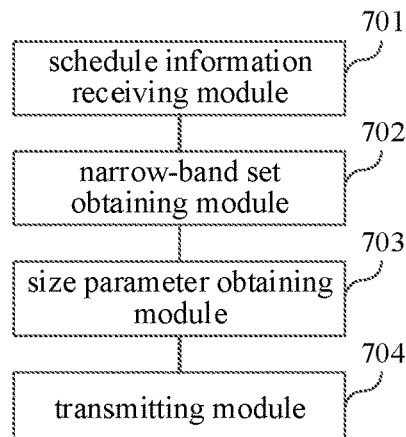
FIG. 7 is a block diagram illustrating an apparatus for transmitting data according to an example embodiment.

FIG. 7 is a block diagram illustrating an apparatus for transmitting data according to an example embodiment. As illustrated in FIG. 7, the apparatus may implement a part of or the entire of a terminal in the implementation environment of FIG. 1 in hardware or a combination of hardware and software to execute steps performed by the terminal as described in any embodiment shown in FIG. 2 or FIG. 4. The apparatus may include a schedule information receiving module 701, a narrow-band set obtaining module 702, a size parameter obtaining module 703 and a transmitting module 704.

The schedule information receiving module 701 is configured to receive schedule information sent by a base station in a physical downlink control channel (PDCCH), in which the schedule information is used to schedule a transmission of at least two transmission blocks.

The narrow-band set obtaining module 702 is configured to obtain a transmission narrow-band set of the at least two transmission blocks, in which the transmission narrow-band set includes at least two narrow-bands.

The size parameter obtaining module 703 is configured to obtain a size parameter of an alternating transmission unit, in which the alternating transmission unit is a data unit composed of multiple repeated transmissions of any one of the at least two transmission blocks, and the size parameter indicates a number of the repeated transmissions of the transmission block in the alternating transmission unit.

The transmitting module 704 is configured to perform an alternating frequency hopping transmission of the at least two transmission blocks with the base station based on the transmission narrow-band set and the size parameter.

Alternatively, the at least two transmission blocks correspond to respective transmission narrow-band sets, each transmission narrow-band set includes at least two narrow-bands. The transmitting module 704 is configured to perform the following steps.

Step a, an alternating transmission unit of a first target transmission block is transmitted with the base station on a narrow-band of the transmission narrow-band set corresponding to the first target transmission block, in which the first target transmission block is any one of the at least two transmission blocks.

Step b, after the transmission of the alternating transmission unit of the first target transmission block is completed, an alternating transmission unit of a second target transmission block is transmitted with the base station on a narrow-band of the transmission narrow-band set corresponding to the second target transmission block, in which the second target transmission block is any one of remaining transmission blocks of the at least two transmission blocks.

Step c, after one round of transmission of an alternating transmission unit of each of the at least two transmission blocks is completed, it is determined whether transmissions of all the alternating transmission units of each of the at least two transmission blocks are completed, if yes, the transmitting is stopped, or else steps a-b are performed.

Alternatively, the at least two transmission blocks correspond to a common transmission narrow-band set. The transmitting module 704 is configured to perform the following steps.

Step a, an alternating transmission unit of a first transmission block is transmitted with the base station on a first narrow-band of the transmission narrow-band set, in which the first transmission block is any one of the at least two transmission blocks and the first narrow-band is any one narrow-band in the transmission narrow-band set.

Step b, after the transmission of the alternating transmission unit of the first transmission block is completed, an alternating transmission unit of a second transmission block is transmitted with the base station on a second narrow-band different from the first narrow-band of the transmission narrow-band set, in which the second transmission block is any one of remaining transmission blocks of the at least two transmission blocks.

Step c, after one round of transmission of an alternating transmission unit of each of the at least two transmission blocks is completed, it is determined whether transmissions of all the alternating transmission units of each of the at least two transmission blocks are completed, if yes, the transmitting is stopped, or else steps a-b are performed.

Alternatively, the narrow-band set obtaining module 702 is configured to: obtain a starting transmission narrow-band of the at least two transmission blocks contained in the schedule information; obtain a frequency hopping step size pre-configured by the base station for the terminal, in which the frequency hopping step size is used to indicate a narrow-band interval between two adjacent narrow-bands in the frequency hopping transmission; obtain at least two narrow-bands for the frequency hopping transmission of the at least two transmission blocks based on the starting transmission narrow-band and the frequency hopping step size; and obtain the transmission narrow-band set based on the at least two narrow-bands for the frequency hopping transmission of the at least two transmission blocks.

Alternatively, the narrow-band set obtaining module 702 is configured to: obtain the transmission narrow-band set of the at least two transmission blocks contained in the schedule information.

Alternatively, the size parameter obtaining module 703 is configured to: obtain a parameter value of a frequency hopping interval pre-configured by the base station, in which the parameter value is configured to indicate a number of repeated transmissions of one transmission block in each frequency hopping transmission; and obtain the parameter value as a value of the size parameter.

Alternatively, the size parameter obtaining module 703 is configured to: obtain the size parameter pre-configured by the base station via a broadcast signaling or a user specific signaling; or obtain the size parameter sent by the base station via the PDCCH.

Alternatively, the size parameter obtaining module 703 is configured to: perform a step of obtaining the size parameter pre-configured by the base station via a broadcast signaling or a user specific signaling or perform a step of obtaining the size parameter sent by the base station via the PDCCH when the base station pre-configures a parameter value of a frequency hopping interval for the terminal and the terminal does not activate the frequency hopping transmission.

Alternatively, the size parameter obtaining module 703 is configured to: obtain a parameter value of a frequency hopping interval as a value of the size parameter when the base station pre-configures the parameter value of the frequency hopping interval for the terminal and the terminal activates the frequency hopping transmission.

Alternatively, in a frequency division duplexing (FDD) coverage enhancement mode A, a value range of the size parameter is {1, 2, 4, 8}; in a frequency division duplexing (FDD) coverage enhancement mode B, a value range of the size parameter is {2, 4, 8, 16}; in a time division duplexing (TDD) coverage enhancement mode A, a value range of the size parameter is {1, 5, 10, 20}; in a time division duplexing (TDD) coverage enhancement mode B, a value range of the size parameter is {5, 10, 20, 40}.

Figure 8:
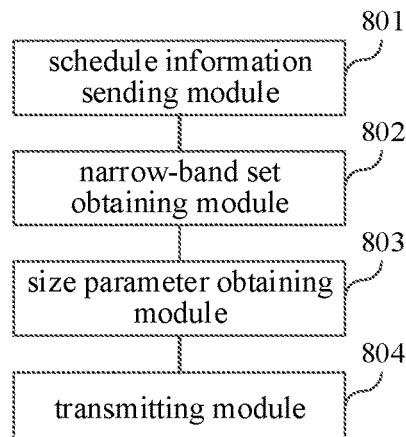
FIG. 8 is a block diagram illustrating an apparatus for transmitting data according to an example embodiment.

FIG. 8 is a block diagram illustrating an apparatus for transmitting data according to an example embodiment. As illustrated in FIG. 8, the apparatus may implement a part of or the entire of a base station in the implementation environment of FIG. 1 in hardware or a combination of hardware and software to execute steps performed by the terminal as described in any embodiment shown in FIG. 3 or FIG. 4. The apparatus may include a schedule information sending module 801, a narrow-band set obtaining module 802, a size parameter obtaining module 803 and a transmitting module 804.

The schedule information sending module 801 is configured to send schedule information to a terminal in a physical downlink control channel (PDCCH), in which the schedule information is used to schedule a transmission of at least two transmission blocks.

The narrow-band set obtaining module 802 is configured to obtain a transmission narrow-band set of the at least two transmission blocks, in which the transmission narrow-band set includes at least two narrow-bands.

The size parameter obtaining module 803 is configured to obtain a size parameter of an alternating transmission unit, in which the alternating transmission unit is a data unit composed of multiple repeated transmissions of any one of the at least two transmission blocks, and the size parameter indicates a number of the repeated transmissions of the transmission block in the alternating transmission unit.

The transmitting module 804 is configured to perform an alternating frequency hopping transmission of the at least two transmission blocks with the terminal based on the transmission narrow-band set and the size parameter.

Alternatively, the at least two transmission blocks correspond to respective transmission narrow-band sets, each transmission narrow-band set includes at least two narrow-bands. The transmitting module 804 is configured to perform the following steps.

Step a, an alternating transmission unit of a first target transmission block is transmitted with the terminal on a narrow-band of the transmission narrow-band set corresponding to the first target transmission block, in which the first target transmission block is any one of the at least two transmission blocks.

Step b, after the transmission of the alternating transmission unit of the first target transmission block is completed, an alternating transmission unit of a second target transmission block is transmitted with the terminal on a narrow-band of the transmission narrow-band set corresponding to the second target transmission block, in which the second target transmission block is any one of remaining transmission blocks of the at least two transmission blocks.

Step c, after one round of transmission of an alternating transmission unit of each of the at least two transmission blocks is completed, it is determined whether transmissions of all the alternating transmission units of each of the at least two transmission blocks are completed, if yes, the transmitting is stopped, or else steps a-b are performed.

Alternatively, the at least two transmission blocks correspond to a common transmission narrow-band set. The transmitting module 804 is configured to perform the following steps.

Step a, an alternating transmission unit of a first transmission block is transmitted with the terminal on a first narrow-band of the transmission narrow-band set, in which the first transmission block is any one of the at least two transmission blocks and the first narrow-band is any one narrow-band in the transmission narrow-band set.

Step b, after the transmission of the alternating transmission unit of the first transmission block is completed, an alternating transmission unit of a second transmission block is transmitted with the terminal on a second narrow-band different from the first narrow-band of the transmission narrow-band set, in which the second transmission block is any one of remaining transmission blocks of the at least two transmission blocks.

Step c, after one round of transmission of an alternating transmission unit of each of the at least two transmission blocks is completed, it is determined whether transmissions of all the alternating transmission units of each of the at least two transmission blocks are completed, if yes, the transmitting is stopped, or else steps a-b are performed.

Alternatively, the narrow-band set obtaining module 802 is configured to: obtain a starting transmission narrow-band of the at least two transmission blocks; obtain a frequency hopping step size configured for the terminal, in which the frequency hopping step size is used to indicate a narrow-band interval between two adjacent narrow-bands in the frequency hopping transmission; obtain at least two narrow-bands for the frequency hopping transmission of the at least two transmission blocks based on the starting transmission narrow-band and the frequency hopping step size; and obtain the transmission narrow-band set based on the at least two narrow-bands for the frequency hopping transmission of the at least two transmission blocks.

Alternatively, the apparatus further includes an adding module configured to: add the transmission narrow-band set into the schedule information before the schedule information sending module sends the schedule information to the terminal in the PDCCH.

Alternatively, the size parameter obtaining module 803 is configured to: obtain a parameter value of a frequency hopping interval configured for the terminal when the frequency hopping interval is pre-configured for the terminal, in which the parameter value is configured to indicate a number of repeated transmissions of one transmission block in each frequency hopping transmission; and obtain the parameter value as a value of the size parameter.

Alternatively, the size parameter obtaining module 803 is configured to: select a first value from a preset value set for the size parameter as a value of the size parameter when a frequency hopping interval is configured for the terminal and the terminal activates the frequency hopping transmission, in which the first value is the same as a parameter value of the frequency hopping interval; select a second value from the preset value set for the size parameter as the value of the size parameter when the frequency hopping interval is not configured for the terminal or when the frequency hopping interval is configured for the terminal and the terminal does not activate the frequency hopping transmission, in which the second value is any value in the preset value set.

Alternatively, the apparatus further includes a configured module or a sending module. The configured module is configured to configure the size parameter for the terminal via a broadcast signaling or a user specific signaling. The sending module is configured to send the size parameter to the terminal via the PDCCH.

Alternatively, in a frequency division duplexing (FDD) coverage enhancement mode A, a value range of the size parameter is {1, 2, 4, 8}; in a frequency division duplexing (FDD) coverage enhancement mode B, a value range of the size parameter is {2, 4, 8, 16}; in a time division duplexing (TDD) coverage enhancement mode A, a value range of the size parameter is {1, 5, 10, 20}; in a time division duplexing (TDD) coverage enhancement mode B, a value range of the size parameter is {5, 10, 20, 40}.

Embodiments of the present disclosure further provide a data transmission system, including a terminal and a base station.

The terminal includes the apparatus for transmitting data according to the embodiment described with reference to FIG. 7. The base station includes the apparatus for transmitting data according to the embodiment described in FIG. 8.

It should be noted that the division of modules in the above apparatus that is taken when implementing the functions is only for illustration. In actual applications, the functions may be assigned to different modules for implementation according to requirements, i.e., the apparatus may be divided into different modules so as to complete all or part of functions described above.

With respect to the apparatus according to the embodiment described above, the ways to perform operations by respective modules have been described in the associated method embodiments, which are not described here.

Embodiments of the present disclosure provide a device for transmitting data, which may implement all or part of steps performed by a terminal and described in the embodiment shown in FIG. 2 or FIG. 4. The device includes a processor and a memory configured to store instructions executable by the processor.

The processor is configured to receive schedule information sent by a base station in a physical downlink control channel (PDCCH), in which the schedule information is used to schedule a transmission of at least two transmission blocks; obtain a transmission narrow-band set of the at least two transmission blocks, in which the transmission narrow-band set includes at least two narrow-bands; obtain a size parameter of an alternating transmission unit, in which the alternating transmission unit is a data unit composed of multiple repeated transmissions of any one of the at least two transmission blocks, and the size parameter indicates a number of the repeated transmissions of the transmission block in the alternating transmission unit; perform an alternating frequency hopping transmission of the at least two transmission blocks with the base station based on the transmission narrow-band set and the size parameter.

Embodiments of the present disclosure provide a device for transmitting data, which may implement all or part of steps performed by a base station and described in the embodiment shown in FIG. 3 or FIG. 4. The device includes a processor and a memory configured to store instructions executable by the processor.

The processor is configured to send schedule information to a terminal in a physical downlink control channel (PDCCH), in which the schedule information is used to schedule a transmission of at least two transmission blocks; obtain a transmission narrow-band set of the at least two transmission blocks, in which the transmission narrow-band set includes at least two narrow-bands; obtain a size parameter of an alternating transmission unit, in which the alternating transmission unit is a data unit composed of multiple repeated transmissions of any one of the at least two transmission blocks, and the size parameter indicates a number of the repeated transmissions of the transmission block in the alternating transmission unit; perform an alternating frequency hopping transmission of the at least two transmission blocks with the terminal based on the transmission narrow-band set and the size parameter.

The solution according to the embodiment of the present disclosure is described by taking a terminal and a base station as an example. It should be understood that the terminal and the base station include respective hardware structures and/or software modules for performing the above functions. In combination with the examples described in the embodiments disclosed in this specification, modules and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Figure 9:
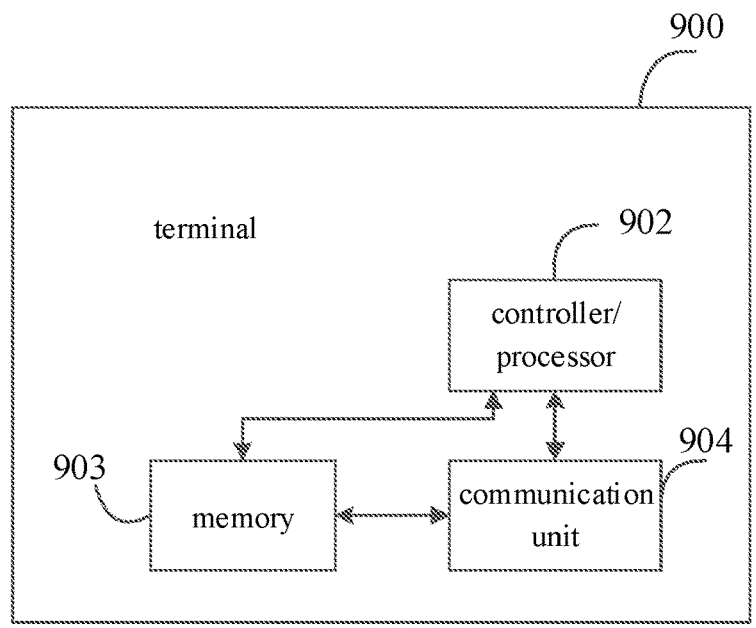
FIG. 9 is a block diagram illustrating a terminal according to an example embodiment.

FIG. 9 is a block diagram of a terminal according to an example embodiment.

The terminal 900 includes a communication unit 904 and a processor 902. The processor 902 may be a controller, and is denoted as "controller/processor 902" in FIG. 9. The communication unit 904 is configured to support communication between the terminal and other network devices such as base stations.

Further, the terminal 900 may further include a memory 903 configured to store program codes and data of the terminal 900.

It should be understood that FIG. 9 merely shows a simplified design of the terminal 900. In actual applications, the terminal 900 may include any number of processors, controllers, memories, communication units and so on, and any terminal which may implement the embodiment of the present disclosure falls into the scope of the embodiment of the present disclosure.

Figure 10:
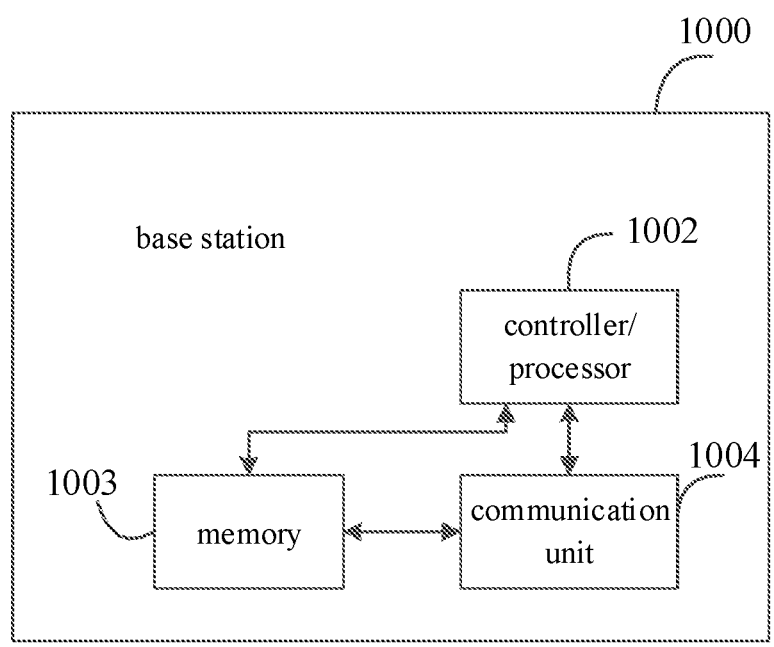
FIG. 10 is a block diagram illustrating a base station according to an example embodiment.

FIG. 10 is a block diagram of a base station according to an example embodiment.

The base station 1000 includes a communication unit 1004 and a processor 1002. The processor 1002 may be a controller, and is denoted as "controller/processor 1002" in FIG. 10. The communication unit 1004 is configured to support communication between the base station and other network devices such as terminals, other base stations, gateways or the like.

Further, the base station 1000 may further include a memory 1003 configured to store program codes and data of the base station 1000.

It should be understood that FIG. 10 merely shows a simplified design of the base station 1000. In actual applications, the base station 1000 may include any number of processors, controllers, memories, communication units and so on, and any base station which may implement the embodiment of the present disclosure falls into the scope of the embodiment of the present disclosure.

A person skilled in the art may be further aware that in one or more embodiments described above, the functions described in the embodiments may be implemented by hardware, software, firmware or combinations thereof. When using the software for implementation, the functions may be stored in a computer readable medium or may be used as one or more instructions or codes in the computer readable medium for transmission. The computer readable medium includes a computer storage medium and a communication medium. The communication medium includes any medium facilitating transferring the computer program from one place to another place. The storage medium may be any medium accessible by a general computer or a dedicated computer.

Embodiments of the present disclosure further provide a computer storage medium, configured to sore computer software instructions used by the terminal or the base station, which includes programs designed for perform the above method for transmitting data.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings and that various modifications and changes can be made without departing from the scope thereof. It is intended that the scope of the invention only be limited by the appended claims.

What is claimed is:

1. A method for transmitting data, performed by a terminal, comprising:
receiving schedule information sent by a base station in a physical downlink control channel (PDCCH), in which the schedule information is used to schedule a transmission of at least two transmission blocks;
obtaining a transmission narrow-band set of the at least two transmission blocks, in which the transmission narrow-band set includes at least two narrow-bands;
obtaining a size parameter of an alternating transmission unit, in which the alternating transmission unit is a data unit composed of multiple repeated transmissions of any one of the at least two transmission blocks, and the size parameter indicates a number of the repeated transmissions of the transmission block in the alternating transmission unit; and
performing an alternating frequency hopping transmission of the at least two transmission blocks with the base station based on the transmission narrow-band set and the size parameter;
wherein transmission of at least two alternating transmission units of a same transmission block is supported during one alternating frequency hopping transmission;
wherein the at least two transmission blocks correspond to a common transmission narrow-band set, the performing the alternating frequency hopping transmission of the at least two transmission blocks with the base station based on the transmission narrow-band set and the size parameter comprises:

step a, transmitting with the base station an alternating transmission unit of a first transmission block on a first narrow-band of the transmission narrow-band set, in which the first transmission block is any one of the at least two transmission blocks and the first narrow-band is any one narrow-band in the transmission narrow-band set;

step b, after the transmission of the alternating transmission unit of the first transmission block is completed, transmitting with the base station an alternating transmission unit of a second transmission block on a second narrow-band different from the first narrow-band of the transmission narrow-band set, in which the second transmission block is any one of remaining transmission blocks of the at least two transmission blocks; and step c, after one round of transmission of an alternating transmission unit of each of the at least two transmission blocks is completed, determining whether transmissions of all the alternating transmission units of each of the at least two transmission blocks are completed, if yes, stopping transmitting, or else performing steps a-b.

2. The method of claim 1, wherein the obtaining the transmission narrow-band set of the at least two transmission blocks comprises:

obtaining a starting transmission narrow-band of the at least two transmission blocks contained in the schedule information;

obtaining a frequency hopping step size pre-configured by the base station for the terminal, in which the frequency hopping step size is used to indicate a narrow-band interval between two adjacent narrow-bands in the frequency hopping transmission;

obtaining at least two narrow-bands for the frequency hopping transmission of the at least two transmission blocks based on the starting transmission narrow-band and the frequency hopping step size; and obtaining the transmission narrow-band set based on the at least two narrow-bands for the frequency hopping transmission of the at least two transmission blocks.

3. The method of claim 1, wherein obtaining the transmission narrow-band set of the at least two transmission blocks comprises:

obtaining the transmission narrow-band set of the at least two transmission blocks contained in the schedule information.

4. The method of claim 1, wherein obtaining the size parameter of the alternating transmission unit comprises:

obtaining a parameter value of a frequency hopping interval pre-configured by the base station, in which the parameter value is configured to indicate a number of repeated transmissions of one transmission block in each frequency hopping transmission; and obtaining the parameter value as a value of the size parameter.

5. The method of claim 1, wherein obtaining the size parameter of the alternating transmission unit comprises one of the following steps:

obtaining the size parameter pre-configured by the base station via any one of a broadcast signaling and a user specific signaling;

or obtaining the size parameter sent by the base station via the PDCCH.

6. The method of claim 5, wherein obtaining the size parameter of the alternating transmission unit comprises one of the following steps:

performing the step of obtaining the size parameter pre-configured by the base station via any one of the broadcast signaling and the user specific signaling when the base station pre-configures a parameter value of a frequency hopping interval for the terminal and the terminal does not activate the frequency hopping transmission or performing the step of obtaining the size parameter sent by the base station via the PDCCH when the base station pre-configures a parameter value of a frequency hopping interval for the terminal and the terminal does not activate the frequency hopping transmission.

7. The method of claim 4, wherein obtaining the size parameter of the alternating transmission unit further comprises:

obtaining the parameter value of the frequency hopping interval as the value of the size parameter when the base station pre-configures the parameter value of the frequency hopping interval for the terminal and the terminal activates the frequency hopping transmission.

8. The method of claim 1, wherein,
in a frequency division duplexing (FDD) coverage enhancement mode A, a value range of the size parameter is $\{1, 2, 4, 8\}$;
in a frequency division duplexing (FDD) coverage enhancement mode B, a value range of the size parameter is $\{2, 4, 8, 16\}$;
in a time division duplexing (TDD) coverage enhancement mode A, a value range of the size parameter is $\{1, 5, 10, 20\}$;
in a time division duplexing (TDD) coverage enhancement mode B, a value range of the size parameter is $\{5, 10, 20, 40\}$.

9. A method for transmitting data, performed by a base station, comprising:

sending schedule information to a terminal in a physical downlink control channel (PDCCH), in which the schedule information is used to schedule a transmission of at least two transmission blocks;

obtaining a transmission narrow-band set of the at least two transmission blocks, in which the transmission narrow-band set includes at least two narrow-bands;

obtaining a size parameter of an alternating transmission unit, in which the alternating transmission unit is a data unit composed of multiple repeated transmissions of any one of the at least two transmission blocks, and the size parameter indicates a number of the repeated transmissions of the transmission block in the alternating transmission unit; and performing an alternating frequency hopping transmission of the at least two transmission blocks with the terminal based on the transmission narrow-band set and the size parameter;

wherein transmission of at least two alternating transmission units of a same transmission block is supported during one alternating frequency hopping transmission;

wherein the at least two transmission blocks correspond to a common transmission narrow-band set, the performing the alternating frequency hopping transmission of the at least two transmission blocks with the terminal based on the transmission narrow-band set and the size parameter comprises:

step a, transmitting with the terminal an alternating transmission unit of a first transmission block on a first narrow-band of the transmission narrow-band set, in which the first transmission block is any one of the at least two transmission blocks and the first narrow-band is any one narrow-band in the transmission narrow-band set;

step b, after the transmission of the alternating transmission unit of the first transmission block is completed, transmitting with the terminal an alternating transmission unit of a second transmission block on a second narrow-band different from the first narrow-band of the transmission narrow-band set, in which the second transmission block is any one of remaining transmission blocks of the at least two transmission blocks;

step c, after one round of transmission of an alternating transmission unit of each of the at least two transmission blocks is completed, determining whether transmissions of all the alternating transmission units of each of the at least two transmission blocks are completed, if yes, stopping transmitting, or else performing steps a-b.

10. The method of claim 9, wherein obtaining the transmission narrow-band set of the at least two transmission blocks comprises:

obtaining a starting transmission narrow-band of the at least two transmission blocks;

obtaining a frequency hopping step size configured for the terminal, in which the frequency hopping step size is used to indicate a narrow-band interval between two adjacent narrow-bands in the frequency hopping transmission;

obtaining at least two narrow-bands for the frequency hopping transmission of the at least two transmission blocks based on the starting transmission narrow-band and the frequency hopping step size; and obtaining the transmission narrow-band set based on the at least two narrow-bands for the frequency hopping transmission of the at least two transmission blocks.

11. The method of claim 10, further comprising:
adding the transmission narrow-band set into the schedule information.

12. The method of claim 9, wherein obtaining the size parameter of the alternating transmission unit comprises:

obtaining a parameter value of a frequency hopping interval configured for the terminal when the frequency hopping interval is pre-configured for the terminal, in which the parameter value is configured to indicate a number of repeated transmissions of one transmission block in each frequency hopping transmission; and obtaining the parameter value as a value of the size parameter.

13. The method of claim 9, wherein obtaining the size parameter of the alternating transmission unit comprises:

selecting a first value from a preset value set for the size parameter as a value of the size parameter when a frequency hopping interval is configured for the terminal and the terminal activates the frequency hopping transmission, in which the first value is the same as a parameter value of the frequency hopping interval;

selecting a second value from the preset value set for the size parameter as the value of the size parameter when the frequency hopping interval is not configured for the terminal or when the frequency hopping interval is configured for the terminal and the terminal does not activate the frequency hopping transmission, in which the second value is any value in the preset value set.

14. The method of claim 13, further comprising one of the following steps:

configuring the size parameter for the terminal via any one of a broadcast signaling and a user specific signaling; or sending the size parameter to the terminal via the PDCCH.

15. A device for transmitting data, comprising:
a processor; and
memory configured to store instructions executable by the processor;
wherein the processor is configured to:
receive schedule information sent by a base station in a physical downlink control channel (PDCCH), in which the schedule information is used to schedule a transmission of at least two transmission blocks;

obtain a transmission narrow-band set of the at least two transmission blocks, in which the transmission narrow-band set includes at least two narrow-bands;

obtain a size parameter of an alternating transmission unit, in which the alternating transmission unit is a data unit composed of multiple repeated transmissions of any one of the at least two transmission blocks, and the size parameter indicates a number of the repeated transmissions of the transmission block in the alternating transmission unit; and perform an alternating frequency hopping transmission of the at least two transmission blocks with the base station based on the transmission narrow-band set and the size parameter;

wherein transmission of at least two alternating transmission units of a same transmission block is supported during one alternating frequency hopping transmission;

wherein the at least two transmission blocks correspond to a common transmission narrow-band set, the processor is configured to perform the alternating frequency hopping transmission of the at least two transmission blocks with the terminal based on the transmission narrow-band set and the size parameter by:

step a, transmitting with the terminal an alternating transmission unit of a first transmission block on a first narrow-band of the transmission narrow-band set, in which the first transmission block is any one of the at least two transmission blocks and the first narrow-band is any one narrow-band in the transmission narrow-band set;

step b, after the transmission of the alternating transmission unit of the first transmission block is completed, transmitting with the terminal an alternating transmission unit of a second transmission block on a second narrow-band different from the first narrow-band of the transmission narrow-band set, in which the second transmission block is any one of remaining transmission blocks of the at least two transmission blocks;

step c, after one round of transmission of an alternating transmission unit of each of the at least two transmission blocks is completed, determining whether transmissions of all the alternating transmission units of each of the at least two transmission blocks are completed, if yes, stopping transmitting, or else performing steps a-b.

16. A device for transmitting data, comprising:
a processor; and
memory configured to store instructions executable by the processor;

wherein the processor is configured to perform the method according to claim 9.

* * * * *